(No Model.)

E. W. DAVIS.
HOOK.

No. 478,313. Patented July 5, 1892.

WITNESSES:
C. M. Hood.
O. H. Merrill.

INVENTOR
Edward W. Davis.
BY
H. P. Hood,
ATTORNEY.

THE NORRIS PETERS CO., PHOTO-LITHO., WASHINGTON, D. C.

UNITED STATES PATENT OFFICE.

EDWARD W. DAVIS, OF INDIANAPOLIS, INDIANA.

HOOK.

SPECIFICATION forming part of Letters Patent No. 478,313, dated July 5, 1892.

Application filed March 19, 1892. Serial No. 425,553. (No model.)

*To all whom it may concern:*

Be it known that I, EDWARD W. DAVIS, a citizen of the United States, residing at Indianapolis, in the county of Marion and State of Indiana, have invented a new and useful Improvement in Ceiling-Hooks, of which the following is a specification.

My invention relates to an improvement in ceiling-hooks, such as are adapted to be secured in the ceiling of a room for the purpose of suspending a chandelier or other heavy article therefrom.

The object of my improvement is to prevent the accidental withdrawal of the hook from the ceiling.

The accompanying drawings illustrate my invention.

Figure 1:
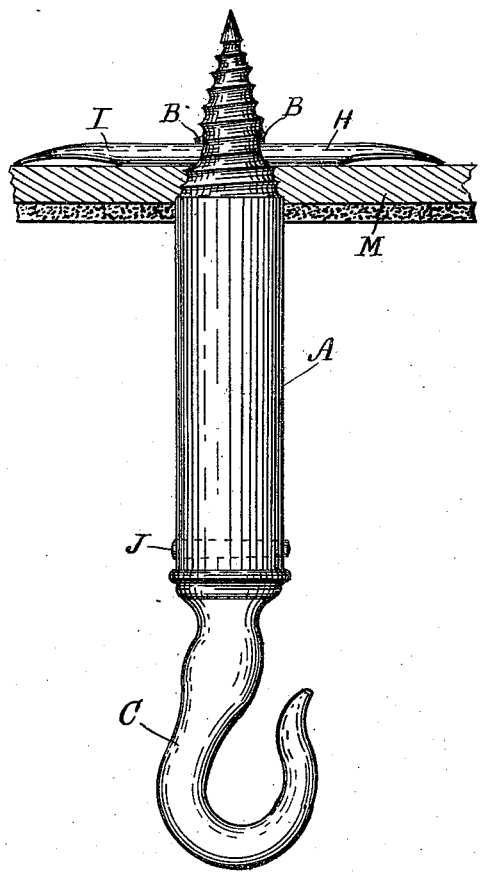
Figure 2:
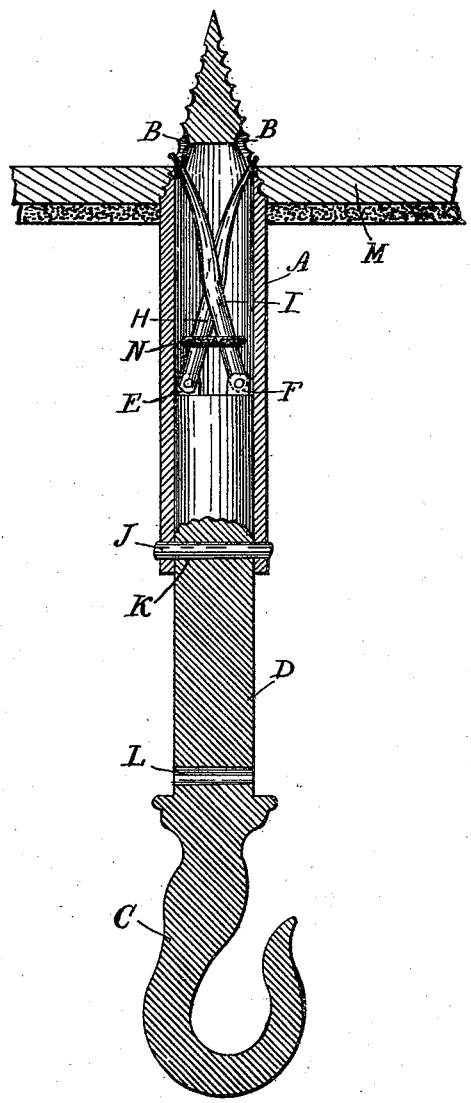

Figure 1 is a side elevation representing the device in position in the ceiling. Fig. 2 represents a vertical section showing the position of the parts preparatory to anchoring the device in the ceiling.

In the drawings, A represents a hollow cylindrical shank having one end tapered and closed and provided with an exterior wood-screw thread. Shank A is provided near the base of its threaded portion on opposite sides with openings B B. The hook C is provided with a cylindrical stem D, which is adapted to fit the interior of shank A, so as to slide easily therein. The upper end of stem D is provided with two longitudinally-projecting lugs E and F, and to these lugs a pair of arms H and I are pivoted at one end, the free ends of said arms being tapered and slightly turned outward and the arms being arranged to swing laterally upon the stem. Said arms are drawn toward each other by an elastic band N. A pin J passes diametrically through the shank A and through one of two openings K and L, passing diametrically through the stem D.

The operation of my device is as follows: Stem D being inserted in shank A, so that the free ends of the arms H and I rest, respectively, in the openings B B of the shank diametrically opposite the lugs to which the respective arms are pivoted, the stem is secured to the shank by passing the pin J through the shank and through the opening K of the stem. A suitable hole having been bored in the ceiling M, shank A is now screwed into and through the ceiling until the openings B B appear above the ceiling. Pin J is now removed and stem D is pushed upward in the shank until the shoulder of the hook comes in contact with the lower end of the shank. By this movement the arms pivoted to the upper end of the stem are thrust outward laterally through the shank in opposite directions and are extended along the upper surface of the ceiling, as shown in Fig. 1. Pin J is now passed through the shank and the opening L in the stem and the device is securely anchored in the ceiling.

I claim as my invention—

1. In a ceiling-hook, the combination of a hollow shank closed and screw-threaded at one end and having diametrical openings in opposite sides of its threaded portion, a hook provided with a stem adapted to fit the interior of said shank, a pair of arms pivoted at one end to said stem and arranged to project laterally therefrom through the openings in the shank, and means for fastening said stem and shank together, all arranged to co-operate substantially as and for the purpose set forth.

2. The above-described ceiling-hook, consisting of a hollow cylindrical shank threaded at one end and provided in its threaded portion with oppositely-arranged openings, the stem adapted to fit and to slide longitudinally within said shank, said stem being provided with a hook at one end and a pair of laterally-swinging arms at its opposite end, the elastic band arranged to draw said arms toward each other, and means, substantially as shown and described, for fastening said stem and shank together, all combined and arranged to co-operate substantially as set forth.

EDWARD W. DAVIS.

Witnesses:
H. P. HOOD,
V. M. HOOD.